United States Patent
Seo

(10) Patent No.: US 10,103,831 B2
(45) Date of Patent: Oct. 16, 2018

(54) METHOD FOR TRANSMITTING AND RECEIVING SIGNAL IN WIRELESS COMMUNICATION SYSTEM AND APPARATUS FOR PERFORMING SAME

(71) Applicant: LG ELECTRONICS INC., Seoul (KR)

(72) Inventor: Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/567,280

(22) PCT Filed: Apr. 26, 2016

(86) PCT No.: PCT/KR2016/004353
§ 371 (c)(1),
(2) Date: Oct. 17, 2017

(87) PCT Pub. No.: WO2016/175535
PCT Pub. Date: Nov. 3, 2016

(65) Prior Publication Data
US 2018/0152257 A1    May 31, 2018

Related U.S. Application Data

(60) Provisional application No. 62/154,666, filed on Apr. 29, 2015.

(51) Int. Cl.
*H04W 72/08* (2009.01)
*H04J 11/00* (2006.01)
(Continued)

(52) U.S. Cl.
CPC .......... *H04J 11/004* (2013.01); *H04L 1/1812* (2013.01); *H04L 27/2647* (2013.01); *H04W 72/082* (2013.01)

(58) Field of Classification Search
CPC ... H04B 1/00; H04B 7/04; H04B 7/06; H04B 7/0452; H04B 15/00; H04J 11/004;
(Continued)

(56) References Cited

U.S. PATENT DOCUMENTS

2011/0124289 A1* 5/2011 Balachandran ...... H04J 11/0053
455/63.1
2013/0215941 A1* 8/2013 Cho ...................... H04L 1/0054
375/222
(Continued)

FOREIGN PATENT DOCUMENTS

WO    WO 2014/104177 A1    7/2014
WO    WO 2015/025664 A1    2/2015

OTHER PUBLICATIONS

Huawei et al., "Overview of UMTS NAICS," 3GPP TSG RAN WG1 Meeting #80, R1-150605, Athens, Greece, Feb. 9-13, 2015, 4 pages.

(Continued)

*Primary Examiner* — Shawkat M Ali
(74) *Attorney, Agent, or Firm* — Birch, Stewart, Kolasch & Birch, LLP

(57) ABSTRACT

A method for receiving, by a first terminal, a signal in a wireless communication system supporting non-orthogonal multiple access (NOMA), according to one embodiment of the present invention, comprises: a step of receiving a NOMA signal in which signals of NOMA-paired terminals are multiplexed by different power values; and a step of removing, from the NOMA signal, an interference by means of a second terminal paired with the first terminal on a resource in which the NOMA signal has been received, wherein the first terminal is NOMA-paired with multiple terminals including the second terminal on different resources, and the second terminal, from among the multiple terminals, is capable of being specified through a HARQ process schedule to the first terminal on the resource in which the NOMA signal has been received.

15 Claims, 11 Drawing Sheets

(51) Int. Cl.
*H04L 27/26* (2006.01)
*H04L 1/18* (2006.01)

(58) Field of Classification Search
CPC ... H04J 13/00; H04J 1/00; H04J 99/00; H04L 1/00; H04L 1/0026; H04L 1/18; H04L 1/1812; H04L 1/24; H04L 5/00; H04L 25/02; H04W 16/28; H04W 24/10; H04W 28/04; H04W 28/048; H04W 52/24; H04W 52/243; H04W 52/28; H04W 72/04; H04W 72/042; H04W 72/08; H04W 72/082
USPC ........ 370/236, 252, 328, 329; 375/219, 295, 375/316, 346; 455/63.1
See application file for complete search history.

(56) References Cited

U.S. PATENT DOCUMENTS

| | | | | |
|---|---|---|---|---|
| 2014/0241273 | A1* | 8/2014 | Kim | H04J 11/005 370/329 |
| 2014/0314006 | A1* | 10/2014 | Suh | H04B 7/0452 370/329 |
| 2015/0264670 | A1* | 9/2015 | Lee | H04L 5/0007 370/312 |
| 2015/0326360 | A1* | 11/2015 | Malladi | H04L 5/0032 370/329 |
| 2016/0191174 | A1* | 6/2016 | Hwang | H04B 15/00 375/348 |
| 2016/0205695 | A1* | 7/2016 | Kishiyama | H04W 72/082 370/315 |
| 2016/0330695 | A1* | 11/2016 | Benjebbour | H04W 52/262 |
| 2017/0171897 | A1* | 6/2017 | Ryu | H04L 29/08306 |
| 2017/0230942 | A1* | 8/2017 | Lim | H04W 72/042 |

OTHER PUBLICATIONS

Institute for Information Industry (III), "Discussion on downlink control channel for multiuser superposition transmission," 3GPP TSG RAN WG1 Meeting #80b, R1-151974, Belgrade, Serbia, Apr. 20-24, 2015, 3 pages.
NTT Docomo, "Evaluation methodologies for downlink multiuser superposition transmissions," 3GPP TSG RAN WG1 Meeting #80bis, R1-152063, Belgrade, Serbia, Apr. 20-24, 2015, pp. 1-6.

* cited by examiner (a)

(b)

METHOD FOR TRANSMITTING AND RECEIVING SIGNAL IN WIRELESS COMMUNICATION SYSTEM AND APPARATUS FOR PERFORMING SAME

CROSS REFERENCE TO RELATED APPLICATIONS

This application is the National Phase of PCT International Application No. PCT/KR2016/004353 filed on Apr. 26, 2016, which claims priority under 35 U.S.C. 119(e) to U.S. Provisional Application No. 62/154,666 filed on Apr. 29, 2015, all of which are hereby expressly incorporated by reference into the present application.

TECHNICAL FIELD

The present invention relates to a wireless communication system, and more particularly, to a method of transmitting or receiving a signal in a wireless communication system supportive of non-orthogonal multiple access and apparatus therefor.

BACKGROUND ART

Wireless communication systems have been widely deployed to provide various types of communication services such as voice or data. In general, a wireless communication system is a multiple access system that supports communication with multiple users by sharing available system resources (e.g., bandwidth, transmit power, etc.). The multiple access system can be categorized into orthogonal multiple access (OMA) and non-orthogonal multiple access (NOMA) depending on whether orthogonality is guaranteed.

As examples of the OMA, frequency division multiple access (FDMA), time division multiple access (TDMA), code division multiple access (CDMA), spatial domain multiple access (SDMA) are included. For each of them, the multiple access is performed in a frequency domain, time domain, code domain, and spatial domain.

Meanwhile, as a multiple access scheme in a power domain, the NOMA can be interconnected with the OMA, whereby it is possible to improve spectral efficiency.

DISCLOSURE OF THE INVENTION

Technical Task

The technical task of the present invention is to provide a method and apparatus for transmitting or receiving a NOMA signal more efficiently and accurately in a wireless communication system supportive of non-orthogonal multiple access (NOMA).

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a signal by a first user equipment in a wireless communication system supportive of non-orthogonal multiple access (NOMA), including receiving a NOMA signal in which signals of NOMA-paired UEs are multiplexed by different power values and canceling, from the NOMA signal, interference caused by a second UE which is paired with the first UE, on a resource in which the NOMA signal is received, wherein the first UE is NOMA-paired with a plurality of UEs including the second UE on different resources, respectively and wherein the second UE among the plurality of UEs is specified through a hybrid automatic repeat request (HARQ) process scheduled for the first UE on the resource in which the NOMA signal is received.

In another technical aspect of the present invention, provided herein is a first user equipment (UE) for receiving a signal in a wireless communication system supportive of non-orthogonal multiple access (NOMA), the first UE a receiver for receiving a NOMA signal in which signals of NOMA-paired UEs are multiplexed by different power values and a processor for canceling, from the NOMA signal, interference caused by a second UE which is paired with the first UE, on a resource in which the NOMA signal is received, wherein the first UE is NOMA-paired with a plurality of UEs including the second UE on different resources, respectively and wherein the second UE among the plurality of UEs is specified through a hybrid automatic repeat request (HARQ) process scheduled for the first UE on the resource in which the NOMA signal is received.

Preferably, each of the plurality of UEs NOMA-paired with the first UE may be mapped to at least one of a plurality of HARQ processes configured for the first UE.

Preferably, the first UE and each of the plurality of UEs may have a same HARQ process number on a NOMA-paired resource.

Preferably, the first user equipment may obtain downlink control information of the second UE based on identifier information of the specified second UE and may cancel a signal of the second UE detected through the downlink control signal of the second UE is canceled from the NOMA signal.

Preferably, at least two of the plurality of UEs may be NOMA-paired with the first UE on different physical resource blocks (PRBs) of a same subframe. More preferably, the first UE may receive, from a base station, information on a frequency band of each of the at least two UEs and the information on the frequency band may indicate an entire frequency band of each of the at least two UEs including the PRBs.

Preferably, the first UE may receive information indicating a set of subframes in which NOMA operation with the plurality of UEs is performed.

Preferably, the first UE may receive information on the plurality of UEs NOMA-paired with the first UE.

Advantageous Effects

According to one embodiment of the present invention, in a wireless communication system supportive of non-orthogonal multiple access (NOMA), since a single UE is NOMA-paired with a plurality of UEs, scheduling fairness damage and throughput loss due to a NOMA operation are minimized. And, a NOMA signal can be transmitted or received more efficiently and accurately by achieving a NOMA pairing in consideration of an HARQ process.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
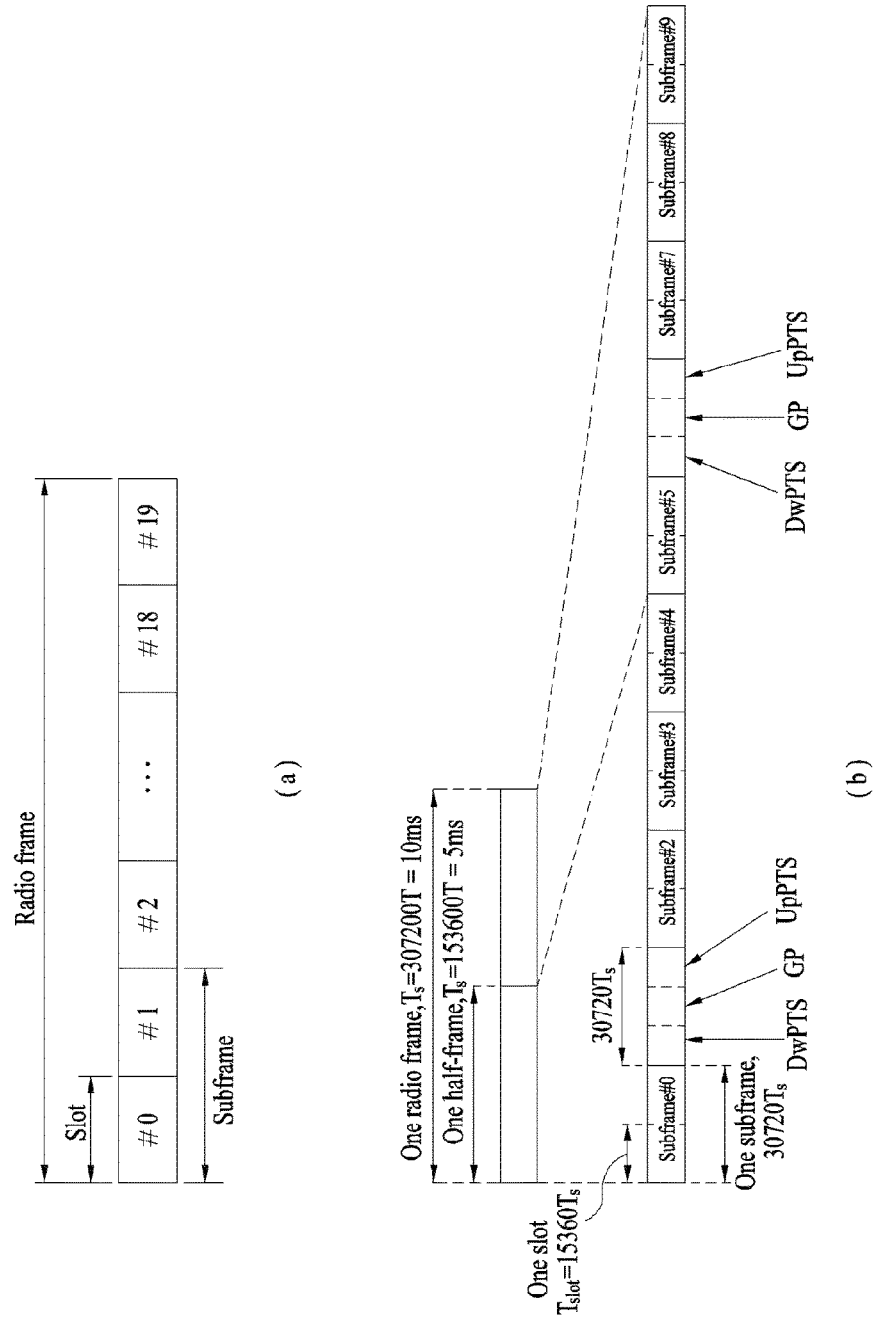
FIG. 1 is a diagram showing a structure of a radio frame.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

NOMA Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which cancels uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
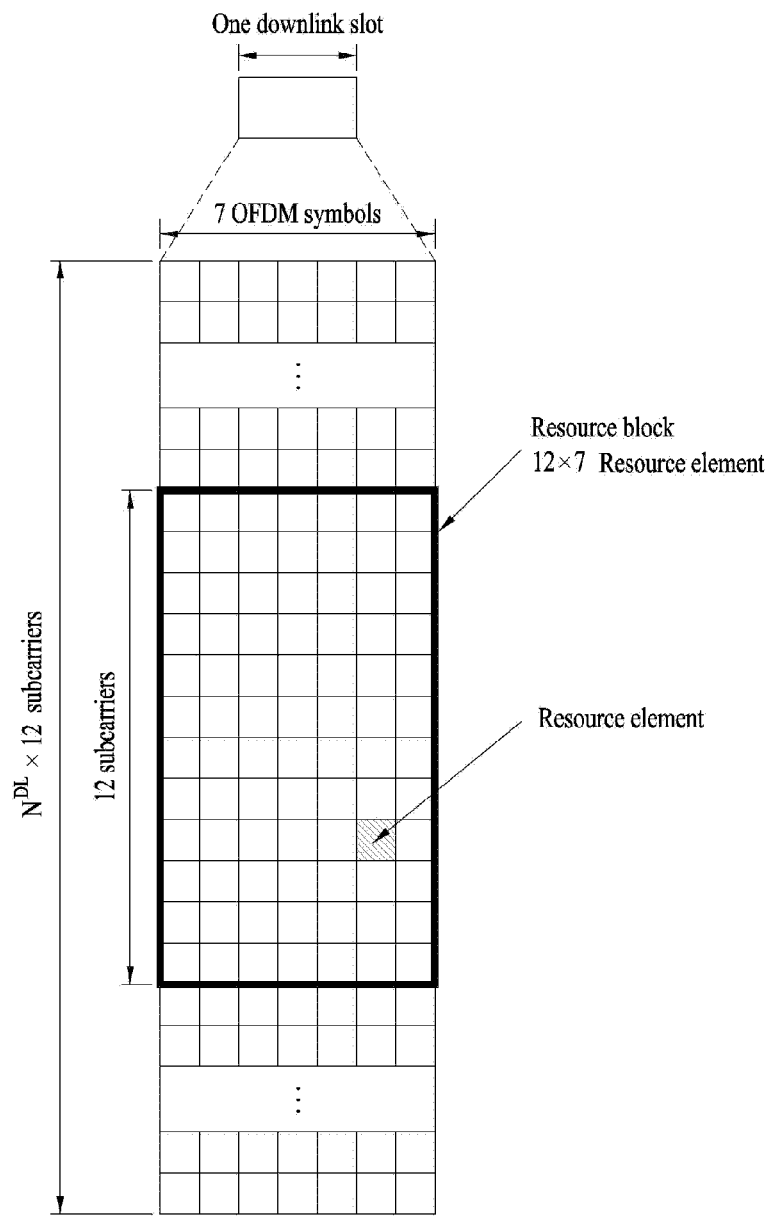
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
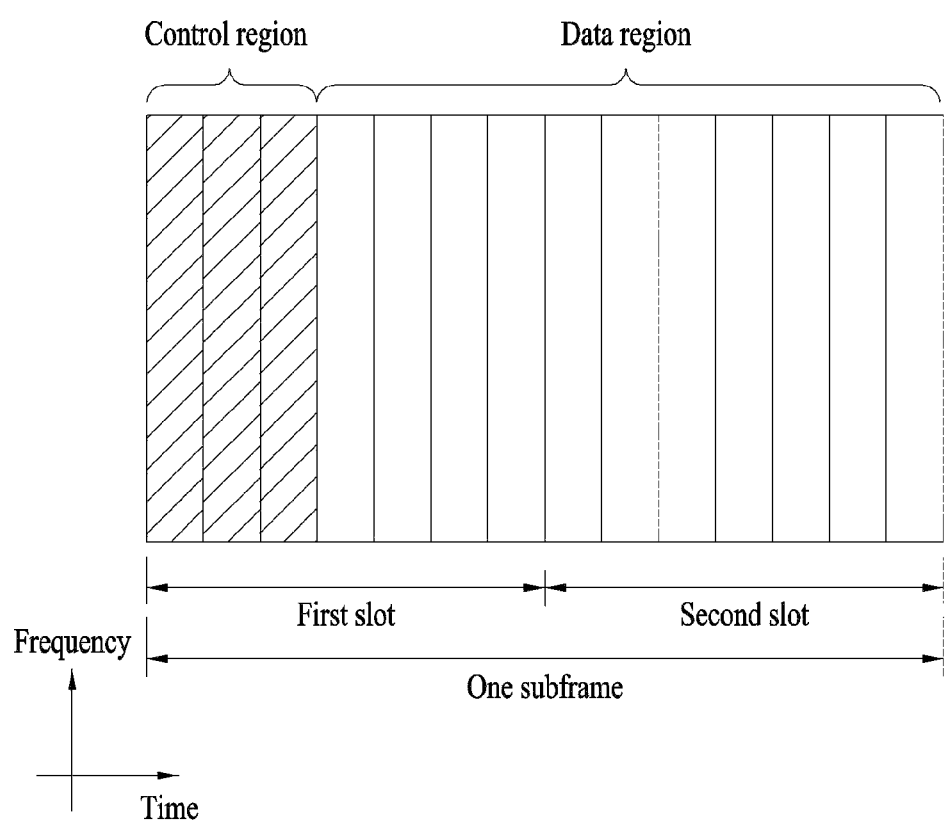
FIG. 3 is a diagram showing a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
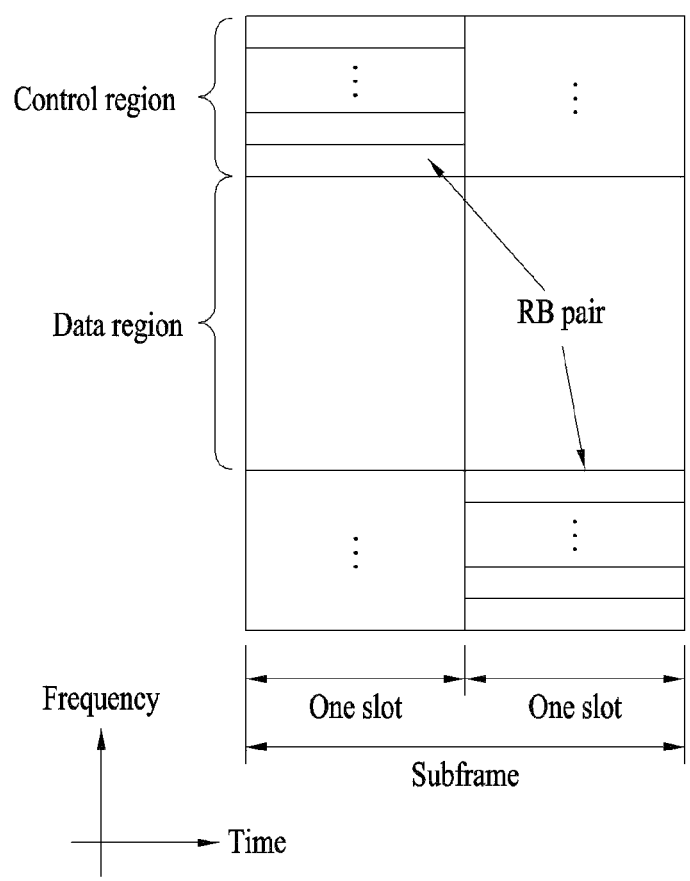
FIG. 4 is a diagram showing a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
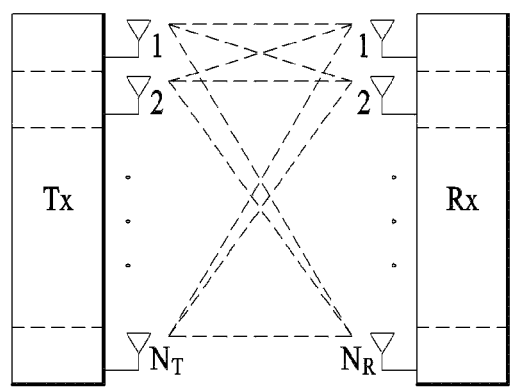
FIG. 5 is a diagram of configuration of a wireless communication system having multiple antennas.
Figure 5:
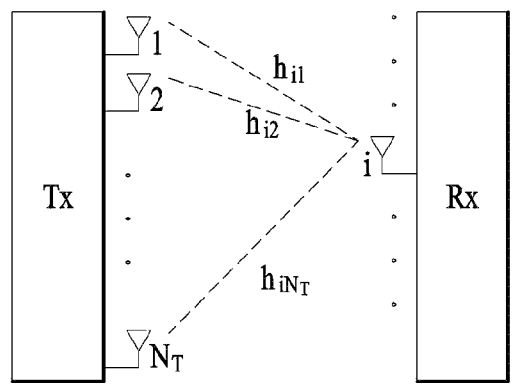

FIG. 5 is a diagram illustrating a configuration of a wireless communication system having multiple antennas.

As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ transmit antennas and $N_R$ receive antennas.

Regarding a transmitted signal, if there are $N_T$ transmit antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$ respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector S having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an transmit antenna $i^{th}$ and $j^{th}$ information. W is also called a precoding matrix.

If the $N_R$ receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the $N_T$ transmit antennas to the receive antenna i. The channels may be combined and expressed in the form of a vector and a matrix. In FIG. 5(b), the channels from the $N_T$ transmit antennas to the receive antenna i can be expressed as follows.

$$h_i^T = [h_{i1}, h_{i2}, \ldots, h_{iN_T}] \quad \text{[Equation 7]}$$

Accordingly, all channels from the $N_T$ transmit antennas to the $N_R$ receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the $N_R$ receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

Initial Access Procedure

Figure 6:
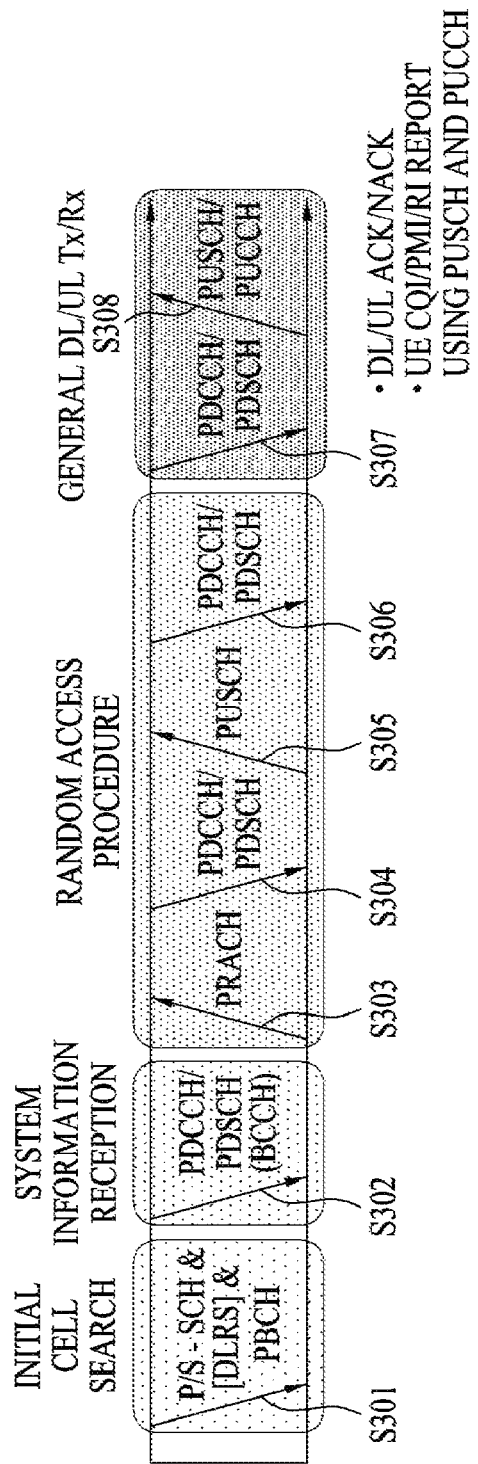
FIG. 6 is a diagram to describe an initial access procedure used for a 3GPP system and a signal transceiving method using physical channels.

FIG. 6 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

NOMA (Non-Orthogonal Multiple Access)

As one of methods for increasing system throughput and the like in a wireless communication system, Non-Orthogonal Multiple Access (hereinafter abbreviated 'NOMA') operation is considered. In an existing OFDMA system, a resource is allocated per UE in frequency-time domain. Yet, in a NOMA system, on the assumption that an interference cancellation receiver is used, a plurality of UEs are assigned to the same frequency-time resource based on a previously determined power ratio. Interference between UEs assigned to the same frequency-time resource can be reduced through the interference cancellation receiver. Thus, the NOMA system is mentioned as a technology candidate of the future 5G system as a multi-access scheme capable of improving efficiency of bandwidth use.

Figure 7:
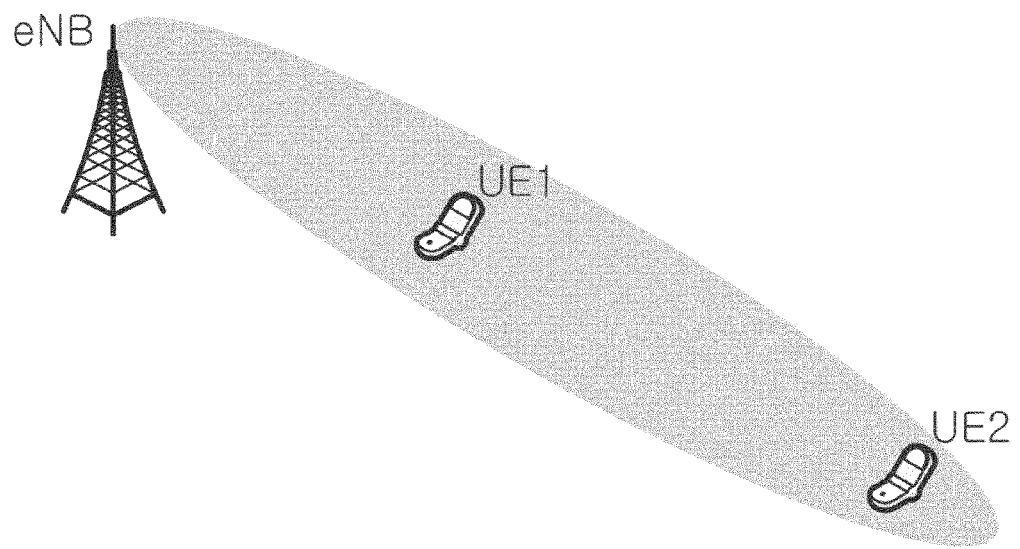
FIG. 7 shows one example of a NOMA environment according to one embodiment of the present invention.

FIG. 7 shows one example of a NOMA environment according to one embodiment of the present invention.

Figure 8:
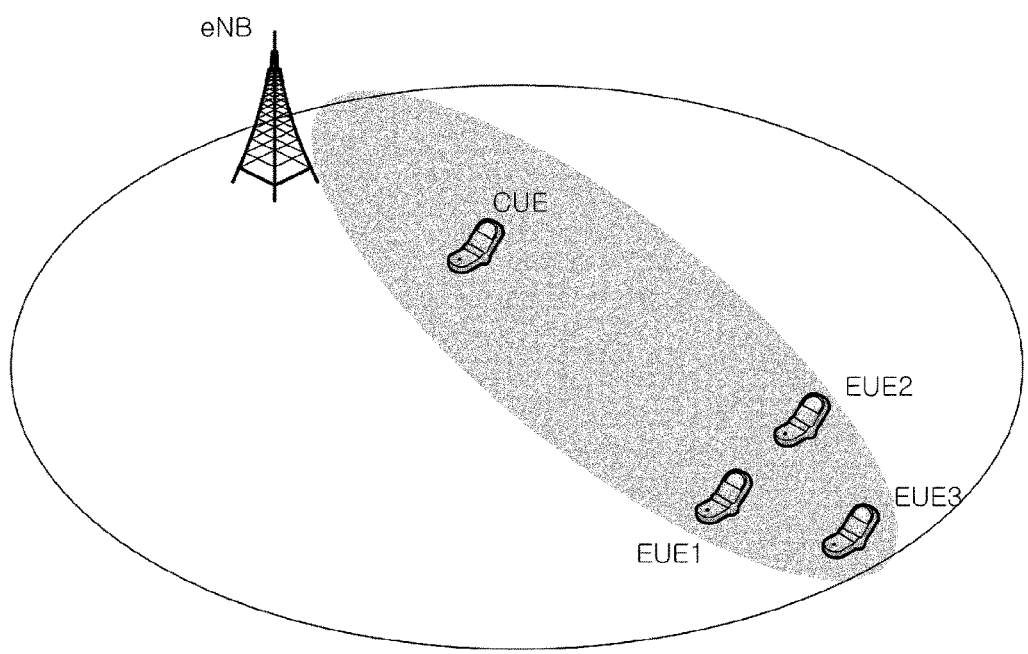
FIG. 8 shows one example of a NOMA environment according to another embodiment of the present invention.

In a NOMA environment, UEs (user equipments) having different transmit powers assigned thereto can be configured as a NOMA pair. In FIG. 8, for clarity, it is illustrated that 2 UEs UE1 and UE2 configure a NOMA pair. And, it is not excluded that more UEs configure a NOMA pair or group.

A base station sets a different DL Tx power per UE belonging to a NOMA pair and is able to send a NOMA signal by superposing modulated symbols of each UE. For example, a relatively small transmit power is set for the UE 1 and a relatively large power is set for the UE 2. Hence, a transmit power assigned to the UE 2 is set greater than the transmit power assigned to the UE 1 in the total transmit power of the NOMA signal.

For clarity of the following description, a UE (e.g., UE 1), to which a low power is assigned because the UE is located in a short distance from a base station (or, because a channel state is good), shall be named a CUE (center UE). And, a UE (e.g., UE 2), to which a high power is assigned because the UE is located in a long distance from a base station (or, because a channel state is poor), shall be named an EUE (edge UE).

In an NOMA system, a CUE cancels interference caused to a received NOMA signal by an EUE signal and is then able to decode a CUE signal. So to speak, since a transmit power of the EUE signal in the NOMA signal is greater than a transmit power of the CUE signal, if the interference caused by the EUE signal is cancelled from the NOMA signal, the CUE can correctly decode the CUE signal.

Meanwhile, the EUE may decode an EUE signal without the interference cancellation process. This is because the transmit power of the CUE signal over the transmit power of the EUE signal can be negligibly small in aspect of the EUE. Yet, the EUE is not prohibited from cancelling the interference caused by the CUE signal from the NOMA signal to improve reception performance of the EUE.

In the following description, through NOMA operation, PDSCH sent to a CUE shall be named C-PDSCH and PDSCH sent to an EUE shall be named E-PDSCH. Downlink (DL) control information for scheduling C-PDSCH shall be named C-DCI, and downlink (DL) control information for scheduling E-PDSCH shall be named E-DCI.

According to one embodiment of the present invention, C-DCI and E-DCI can be transmitted to CUE through independent PDCCHs, respectively. For example, C-DCI is transmitted through C-PDCCH (i.e., PDCCH for CUE), and E-DCI is transmitted through E-PDCCH (i.e., PDCCH for EUE). C-PDCCH and E-PDCCH may be individually transmitted instead of being transmitted as a single NOMA signal. CUE receives C-PDCCH and may additionally overhear E-PDCCH.

According to another embodiment of the present invention, a new DCI format may be defined for NOMA operation. For example, a new DCI format can include both C-DCI information and E-DCI information, and a new DCI having C-DCI and E-DCI combine therein may be transmitted through PDCCH. A new DCI format may be transmitted by Non-NOMA scheme. A new DCI format may be set in common to CUE and EUE. For example, CUE obtains both C-DCI and E-DCI by decoding a new DCI format, and EUE may use an E-DCI part only by decoding the new DCI format. The new DCI format may be named as NOMA DCI.

Interference Cancellation in NOMA System

For elimination or cancellation of an EUE signal, an eNB may send information on the EUE signal to a CUE. The CUE should perform demodulation in consideration of a signal of an EUE having a relatively large power while using a same resource (e.g., time, frequency, space). For example, the CUE generates an interference signal (e.g., EUE signal) based on the information on the EUE signal and is then able to obtain its signal (e.g., CUE signal) by cancelling the interference signal from a received NOMA signal.

A method for a CUE to cancel interference caused by an EUE signal in a NOMA system can be classified into Symbol-Level Interference Cancellation (hereinafter abbreviated 'SLIC') or CodeWord-level Interference Cancellation (hereinafter abbreviated 'CWIC').

SLIC means a scheme of cancelling a modulated symbol of an interference signal from a received symbol by estimating the interference signal up to a modulated symbol level only. Therefore, in SLIC, decoding of an interference signal is not performed but decoding can be performed on its signal only.

According to CWIC, a CUE obtains an information bit sequence (e.g., codeword) by performing decoding on an interference signal as well as demodulation. Thereafter, the CUE encodes and modulates the information bit sequence (e.g., encoding and modulation of codeword like a transmitter). The CUE obtains its signal (e.g., CUE signal) by cancelling a signal (e.g., an estimated EUE signal) resulting from multiplying a modulated symbol generated from modulation result and an estimated channel component from a received signal (e.g., a received NOMA signal).

CWIC has interference cancellation performance better than that of SLIC. Yet, CWIC even requires needs information for decoding, whereas SLIC requires schematic information on modulation order of an interference signal only. Hence, in case of CWIC, a size information (e.g., information on an interference signal or an EUE signal) supposed to be delivered to a CUE increases in comparison with a case of SLIC.

Multiple NOMA Pairing Configuration & NOMA Resource Configuration

As described above, NOMA operation means that UEs perform multiple accesses in a power domain. For example, in the NOMA operation, an available (DL) Tx power is assigned in a manner of being distributed to CUE and EUE. Hence, looking into NOMA operation in aspect of EUE, the EUE experiences interference and noise already existing before performing a NOMA operation and also receives interference caused by CUE that shares the same beam with the EUE by the NOMA operation. Hence, the EUE, which receives the NOMA operation, receives interference and noise more than those received by another ambient EUE failing to receive the NOMA operation. Thus, the EUE NOMA-paired with the CUE experiences losses in aspect of throughput and scheduling fairness. For example, in overall aspect of a wireless communication system, NOMA operation can use limited radio resources more intensively and efficiently, and may be advantageous in aspects of total system capacity and throughput. Yet, in individual UE's aspect, it may be advantageous for an individual UE to minimize power and resource sharing rather than to perform NOMA operation.

Schemes for solving the aforementioned problem while maintaining NOMA gain are described as follows.

According to one embodiment of the present invention, a single CUE can perform NOMA operation with a plurality of EUEs. Methods described in the following are applicable not only to CUE but also to EUE capable of NOMA operation and interference cancellation.

According to the following embodiments, since different interferences are applied to different resources, respectively, a sort of diversity gain can be obtained advantageously. For example, although UE 1 performs NOMA operation with UE 2 on a first resource, assume that UE 1 performs NOMA operation with UE 3 on a second resource. In doing so, although relatively large interference occurs in the first resource, the UE 1 can perform NOMA operation through the second resource. Thus, by setting the number of UEs NOMA-paired with UE 1 to multiple and distributing resources capable of NOMA operation, a sort of diversity gain can be obtained.

If NOMA operation is performed between CUE and EUE in aspect of eNB, it may include an operation of NOMA-paring CUE and EUE with each other, providing transmission information of EUE to CUE, generating NOMA signal by multiplexing a signal (e.g., C-PDSCH) of CUE and a signal (e.g., E-PDSCH) of EUE with different power values, respectively, and then sending the NOMA signal.

In aspect of CUE, if CUE performs NOMA operation with EUE, it means that a signal is received on the assumption that the CUE is NOMA-paired with the corresponding EUE. For example, if CUE performs NOMA operation with EUE, it may include an operation of canceling interference caused by a signal of EUE from a NOMA signal having a signal (e.g., C-PDSCH) of CUE and a signal (e.g., E-PDSCH) of EUE multiplexed with different power values and receiving the signal of CUE. Moreover, the NOMA operation with EUE may include an operation for CUE to obtain E-DCI or NOMA DCI to cancel interference caused by a signal of EUE.

The following embodiments may be regarded as configuring a resource on which NOMA operation can be performed. Thus, if a NOMA operation capable resource is configured, it may be efficient in reducing complexity of UE (e.g., in blind detection or the like, a case for a UE to perform blind detection by RB units).

In order for CUE to receive its signal through NOMA operation, the CUE should be aware of transmission information (e.g., E-DCI or NOMA DCI) of EUE. Since a signal of CUE and a signal of EUE are multiplexed with different power values in a NOMA signal transmitted through NOMA operation, the CUE can receive its signal correctly only if cancelling interference caused by the signal of the EUE. As a method for CUE to obtain transmission information of EUE, it is able to use a scheme for CUE to detect a NOMA DCI format newly defined for NOMA operation, a scheme for CUE to overhear E-DCI, a scheme for CUE to blind-detect information on E-PDSCH, and the like.

For example, if a resource on which NOMA operation may be possibly performed is signaled to CUE, the CUE can grasp a resource on which NOMA operation is not performed based on the corresponding signaling. Since it is not necessary for the CUE to overhear or blind-detect NOMA DCI format or E-DCI from the resource on which the NOMA operation is not performed, UE's power consumption can be reduced as well as UE complexity.

In the following description, if an eNB indicates a NOMA operation, it means that a resource on which NOMA operation may be possibly performed is indicated or that a resource on which NOMA operation is actually performed is indicated. In the following, a resource on which NOMA operation may be possibly performed or a resource on which NOMA operation is actually performed shall be named NOMA resource.

NOMA resources according to embodiments of the present invention may be defined in a time domain, a frequency domain, and the like.

First of all, NOMA resource configuration in time domain is described. In case that a plurality of EUEs are paired with a single CUE in a time domain, the following method can be used. In the following proposal, a NOMA subframe or resource configured by an eNB may mean a NOMA performed subframe or a subframe in which NOMA can be performed. In case of meaning the subframe in which NOMA can be performed, a UE (e.g., CUE) performs blind detection on an interference signal (e.g., signal of EUE), DCI (e.g., E-DCI) of an interference signal, or information corresponding to DCI of an interference signal, thereby determining whether a NOMA operation is actually performed in the corresponding subframe. Moreover, the CUE may receive different (NOMA) DCIs on time/frequency resources on which different subframe sets or different NOMA operations signaled by the eNB or overhear different DCIs (of EUEs).

Indexes of the following embodiments are provided for clarity of the description. It is not mandatory to configure an independent invention per index. Embodiments having different indexes may configure a single invention by being combined together.

Embodiment 1. NOMA Periodicity

An eNB can schedule NOMA operation with reference to NOMA periodicity that is predefined or set by upper layer signaling or the like. For example, a basic unit of NOMA period is predefined as 1 radio frame (e.g., 10 ms), and an eNB can schedule NOMA operation using a bitmap of the corresponding basic unit.

According to the present embodiment, NOMA period is preset for example. Yet, according to another embodiment, an eNB may signal a basic unit of NOMA period to UEs (e.g., through upper layer signaling). A basic unit of the NOMA period set in the above manner may be set through UE-specific signaling or cell-specific signaling.

An eNB may instruct a CUE of NOMA operation with a plurality of EUEs through a corresponding bitmap. If the CUE performs NOMA operation with a plurality of the EUEs, the eNB may send information on a plurality of the EUEs to the CUE. Information on different EUEs may be provided to the CUE through different NOMA DCIs, respectively, or the CUE may obtain information on different EUEs by overhearing or blind-detecting different E-DCIs. In order for the CUE to overhear or blind-detect E-DCI, the eNB can signal UE ID (e.g., RNTI) of each of a plurality of the EUEs, which will perform NOMA operation with the CUE, to the CUE.

Embodiment 2. Subframe Specific NOMA Operation

According to one embodiment of the present invention, NOMA operation can be performed subframe-specifically. If a basic unit of NOMA period is a subframe, NOMA operation may be defined through a subframe set. The subframe set for the NOMA operation may be defined per interfering UE (e.g., EUE), or the paring with a plurality of EUEs may be indicated through a single bitmap. For one example, in case that an ENB intends to schedule NOMA operations of 1 CUE and 2 EUEs, the eNB can signal a bitmap of a specific length (e.g., 40 bits for 40 ms) to the CUE. In doing so, the NOMA operation with EUE 1 may be defined as performed on a bit set to '0' in the bitmap, and the NOMA operation with EUE 2 may be defined as performed on a bit set to '1'. Meanwhile, the meaning of each bit value may be defined to the contrary.

Or, the eNB may signal a bitmap for each EUE to the CUE. For example, a bitmap 1 for the NOMA operation of the CUE and the EUE 1 and a bitmap 2 for the NOMA operation of the CUE and the EUE 2 may be provided to the CUE. The NOMA operation with the corresponding EUE may not be performed on a bit set to '0' in each bitmap, but the NOMA operation may be performed on a bit set to '1'. Meanwhile, the meaning of each bit value may be defined to the contrary.

According to one embodiment, NOMA operation of CUE and EUE 1 and NOMA operation of CUE and EUE 2 are configured, and the CUE can find out transmission information to the corresponding EUE by overhearing each E-DCI. For example, the CUE can overhear E-DCI in each subframe set based on information (e.g., C-RNTI$_{EUE1}$, C-RNTI$_{EUE2}$) of EUEs set by an eNB. For detailed example, in a first subframe set for NOMA operation of CUE and EUE 1, the CUE can overhear (or attempt to blind-detect) DCI of the EUE 1 using C-RNTI$_{EUE1}$. Since CRC of PDCCH carrying the DCI of the EUE 1 is scrambled with C-RNTI$_{EUE1}$, the CUE can blind-detect the PDCCH scrambled with C-RNTI$_{EUE1}$ in the first subframe set using C-RNTI$_{EUE1}$. Similarly, in a second subframe set for NOMA operation of CUE and EUE 2, the CUE can overhear (or attempt to blind-detect) DCI of the EUE 2 using C-RNTI$_{EUE2}$.

Embodiment 3. HARQ Process Specific NOMA Operation

According to one embodiment of the present invention, NOMA operation can be performed HARQ-process-specifically.

For instance, an eNB may indicate NOMA operations with different EUEs by HARQ process unit. For example, a CUE may be set or signaled so as to perform NOMA operation with EUE 1 in HARQ processes 0, 2, 4 and 6 among total 8 HARQ processes configured for the CUE and perform NOMA operation with EUE 2 in HARQ processes 1, 3, 5 and 7. For instance, if HARQ process number information contained in NOMA DCI or C-DCI is 0, 2, 4 or 6, the CUE performs the NOMA operation with EUE 1. Meanwhile, whether to perform NOMA operation with a prescribed EUE at a prescribed HARQ process number may be set by the eNB.

Thus, if NOMA operation is performed HARQ-process-specifically, interference by CUE may be regarded as existing in a specific HARQ process only in aspect of EUE. As describe above, this is because the NOMA operation can be regarded as having interference caused by a CUE signal in aspect of EUE. For instance, in case of EUE 1, interference caused by CUE exists in the HARQ processes 0, 2, 4 and 6 but fails to exist in the HARQ processes 1, 3, 5 and 7.

If the NOMA operation with the EUE 1 is set to be performed in the HARQ process 0, the CUE can assume that an HARQ process number of the EUE is identical in a subframe in which the NOMA operation is performed by the HARQ process 0 of the CUE. For instance, if it is configured that the CUE and the EUE 1 perform the NOMA operation in HARQ process #N, an HARQ process number of the EUE 1 can be set to N in the subframe corresponding to the HARQ process #N of the CUE. For instance, when the NOMA operation is performed, if the eNB schedules the HARQ process #N for the CUE through C-DCI, the eNB can be regarded as scheduling the HARQ process #N for the EUE through E-DCI. Yet, in case of HARQ process for which NOMA operation is not set, HARQ process numbers of the CUE and the EUE may be set independent from each other. For instance, since the CUE performs the NOMA operation with the EUE 2 in the subframe corresponding to the HARQ process #1 of the CUE, the HARQ process number of the EUE 1 in the corresponding subframe may be not 1 but 3, 5 or 7.

Moreover, in case that the eNB signals NOMA DCI or E-DCI to the CUE, since the eNB need not have information on the HARQ process of the EUE contained in the corresponding DCI, it is able to reduce signaling overhead.

In the above mentioned embodiment, the HARQ process number of the CUE matches the HARQ process number of the EUE in the NOMA operation performed subframe for example. Yet, the HARQ process of the CUE and the HARQ process of the EUE may be equivalently regarded as 1:1 mapped to each other. For instance, for the NOMA operation, HARQ processes #A to #D of the CUE can be mapped to HARQ processes #E to #H, respectively. For instance, in a subframe corresponding to the HARQ process #B of the CUE, the HARQ process #F of the EUE can be scheduled to be performed. The eNB can signal the mapping between the HARQ process of the CUE and the HARQ process of the EUE to the CUE.

HARQ-process-specific NOMA operation is applicable to Embodiment 1 and/or Embodiment 2. For instance, in configuring a NOMA operation performed subframe, CUE and EUE can be assumed as paired by HARQ process unit.

Thus, if CUE and EUE are paired by HARQ process unit, complexity of UE can be reduced according to HARQ operation of the CUE and the EUE. For example, in an initial transmission of a specific HARQ process, CUE is assumed as succeeding in data decoding of EUE and the EUE is assumed as failing in decoding its data in a corresponding subframe. Hence, EUE data is retransmitted in a next subframe of the corresponding HARQ process. In doing so, the CUE having succeeded in decoding the EUE data in a previous subframe (e.g., initial transmission) can perform interference cancellation (e.g., CWIC) using the same EUE data stored owing to the successful decoding without decoding EUE data retransmitted in a current subframe. Since it is guaranteed that the same interference is caused from EUE in retransmission by the same HARQ process, complexity of CUE operation can be reduced and reliability can be enhanced. This is the advantage in case of pairing CUE and EUE by HARQ process unit. If HARQ processes of CUE and EUE are independently configured, such a technical effect cannot be obtained.

Meanwhile, an eNB may instruct CUE of information indicating whether transmission to EUE is an initial transmission or a retransmission, or the CUE may be aware of such information through blind detection. For instance, the CUE may be aware of a presence or non-presence of retransmission through information such as NDI contained in the blind-detected E-DCI or the like, by which the present embodiment is non-limited.

Embodiment 4. Multiple NOMA Pairing in Frequency Domain

The aforementioned embodiments are applicable to a frequency domain. For example, an eNB can configure NOMA operation with different EUEs by a unit of PRB, PRB pair, or set of PRB pairs in a frequency domain. The eNB may inform a CUE whether NOMA operation is performed with two or more EUEs in the same subframe. The eNB may also indicate NOMA operation with a specific UE using the aforementioned embodiments (e.g., bitmap) and the like in a frequency domain. For example, the eNB can inform the CUE that NOMA operation is performed with EUE 1 in a PRB pair of an odd index in BW occupied by the CUE and that NOMA operation is performed with EUE 2 in a PRB pair of an even index.

Thus, if NOMA operation is performed with a plurality of EUEs in a frequency domain, a CUE should be aware of all information on different EUEs within a single subframe. For instance, it means that a CUE is unable to perform NOMA operation with information on a single EUE only. When a CUE overhears (or blind-detects) DCI on EUE 1 in a specific subframe, even if a modulation order QPSK is detected as a result of the overhearing or blind detection, the CUE is unable to apply the detected modulation order QPSK to the entire corresponding subframe in cancelling interference. Thus, the number of E-DCI overhearing, blind detections or receptions, which should be performed by the CUE, may be changed depending on the number of NOMA-paired EUEs.

For the multiple NOMA pairing in such a time/frequency domain, an eNB may signal BW occupied by each EUE to a CUE accurately as well as resource distribution of EUE within a resource of the CUE. For instance, an eNB can signal all RBs allocated to an EUE to a CUE as well as EUE's RB overlapping CUE's RBs only. Although NOMA operation is performed with the CUE on some of the whole RBs allocated to the EUE, the CUE should be able to decode data provided to the EUE in order to cancel interference by CWIC scheme.

Moreover, the aforementioned embodiments are applicable to a time/frequency domain independently or through combination. For instance, a CUE performs NOMA operation for each of EUE 1 and EUE 2 on different frequency resources in a subframe set 1, and may perform NOMA operation for each of EUE 3 and EUE 4 on different frequency resources in a subframe set 2.

Figure 9:
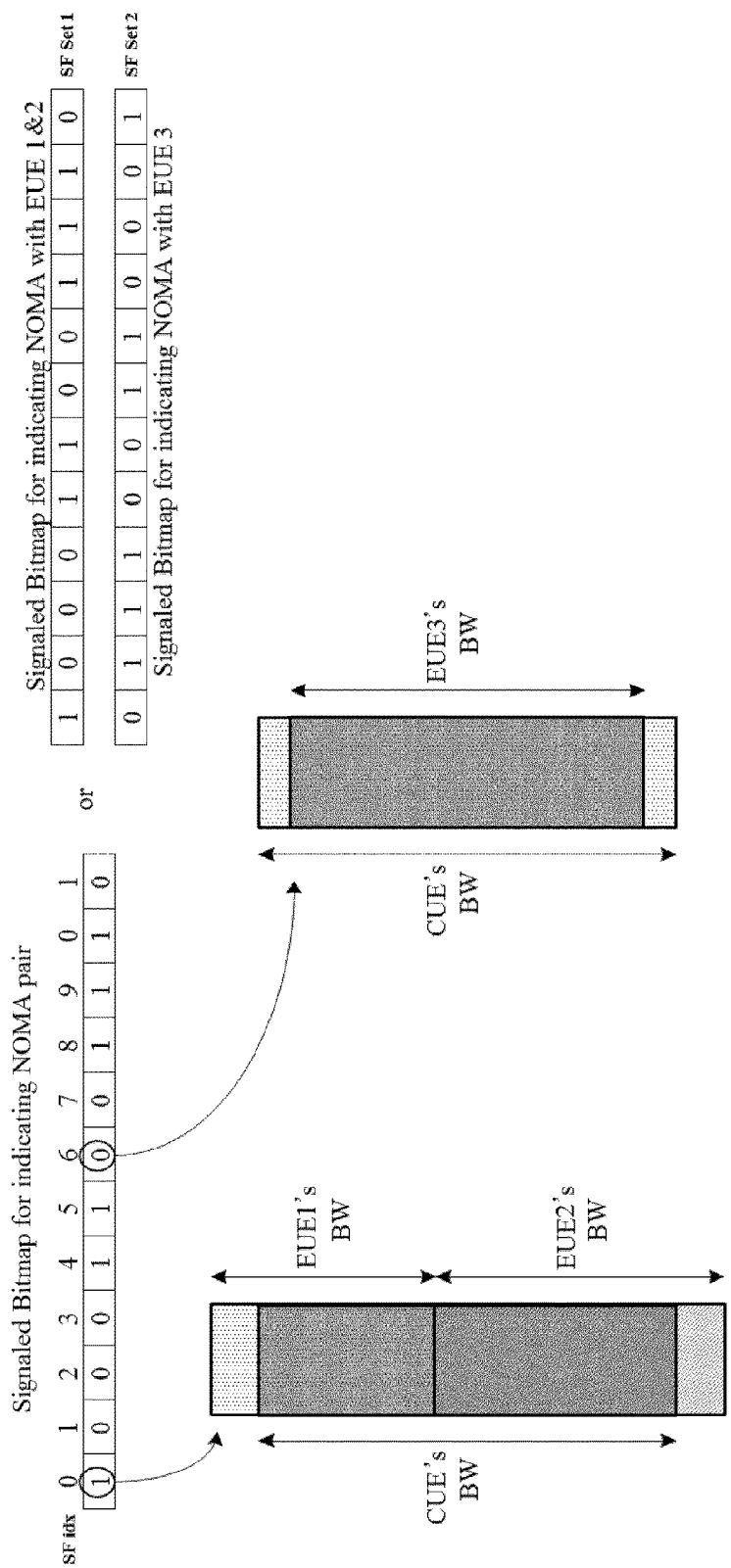
FIG. 9 is a diagram to describe a NOMA pairing according to one embodiment of the present invention.

FIG. 8 shows one example of a NOMA environment according to another embodiment of the present invention. FIG. 9 shows one example of a NOMA pairing of a CUE in the NOMA environment shown in FIG. 8.

Referring to FIG. 8, a CUE is NOMA-paired with a plurality of EUEs EUE 1 to EUE 3. A multitude of the EUEs can be NOMA-paired with the CUE on different resources.

Referring to FIG. 9, an eNB performs NOMA operation between CUE and EUE 1 & EUE 2 in a subframe set 1, and also performs NOMA operation between CUE and EUE 3 in a subframe set 2.

For such NOMA operations, the eNB can signal one or more subframe patterns (e.g., bitmap indicating a subframe set) to the CUE. The CUE grasps that different NOMA operations (e.g., power offset, interferer's BW, etc.) are performed in the subframe sets, respectively, and is then able to obtain data of EUE(s) paired on the corresponding subframe set through NOMA DCI or E-DCI overhearing, blind detection, or the like. The CUE then performs interference cancellation using the obtained data of the EUE.

Moreover, in a subframe belonging to the subframe set 1 of FIG. 9, the CUE performs NOMA operation with a plurality of EUEs (e.g., EUE 1 and EUE 2). For instance, the CUE can perform the NOMA operation for the EUE 1 and the NOMA operation for the EUE 2 in the same subframe. The CUE may detect EUE for which DL data transmission is actually scheduled through NOMA DCI or E-DCI overhearing or the like or detect BW and power offset of each EUE and the like, thereby using it for interference cancellation.

According to the embodiments of the present invention, as described above, a throughput loss of EUE NOMA-paired with CUE can be reduced. Moreover, after configuring NOMA operations with a plurality of EUEs for CUE, an eNB performs NOMA operation in consideration of a channel status of each UE and a presence or non-presence of necessity for transmission to each EUE at a timing point of transmitting data actually. Therefore, more flexible scheduling is possible.

Figure 10:
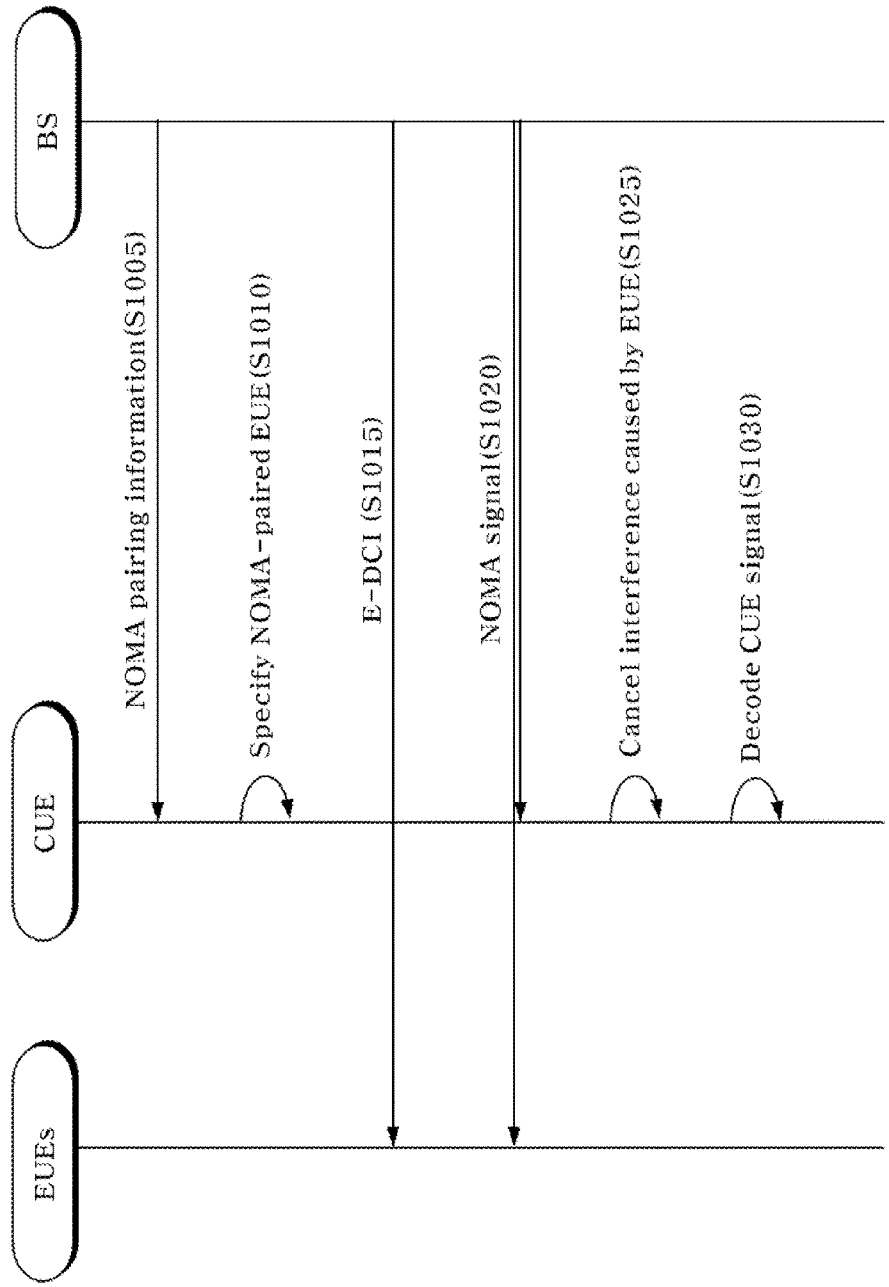
FIG. 10 is a flowchart of a method of transmitting/receiving a NOMA signal according to one embodiment of the present invention.

FIG. 10 is a flowchart of a method of transmitting/receiving a NOMA signal according to one embodiment of the present invention. And, description redundant with the aforementioned description shall be omitted.

Referring to FIG. 10, a CUE is NOMA-paired with a plurality of EUEs. For instance, the CUE can be NOMA-paired with a plurality of the EUEs on different resources (e.g., time/frequency), respectively.

A base station signals NOMA pairing information to the CUE [S1005]. The NOMA pairing information may include information on a time and/or frequency resource on which the CUE performs NOMA operations with a plurality of EUEs. For instance, the NOMA pairing information may include information on subframes (e.g., a bitmap indicating a set of subframes) in which the CUE performs NOMA operations with a plurality of EUEs. Moreover, the NOMA pairing information may include information (e.g., RNTI, etc.) on EUEs NOMA-paired with the CUE.

According to one embodiment, at least two of a plurality of EUEs can be NOMA-paired with the CUE on different PRBs (physical resource blocks) of the same subframe. For instance, the CUE can receive information on a frequency band of each of at least two NOMA-paired EUEs from the base station. The information on the frequency band of each of the EUEs may be signaled through NOMA pairing information. The information on the frequency band of each of the EUEs may indicate the entire frequency band of each of at least two EUEs including PRBs for NOMA paring.

Moreover, the CUE may be NOMA-paired with EUEs by HARQ process unit. For instance, each of the EUEs NOMA-paired with the CUE can be mapped to at least one of a plurality of HARQ processes configured for the CUE. And, the CUE and each of the EUEs may have the same HARQ profess number on the NOMA-paired resource. The NOMA pairing information may include information indicating that each of the EUEs is mapped to which one of the HARQ processes of the CUE.

The CUE can specify the NOMA-paired EUE on a resource on which a NOMA signal will be received [S1010]. For instance, the CUE can specify the NOMA-paired EUE based on the NOMA pairing information. For clarity, assume that the CUE and EUE 2 are NOMA-paired on the corresponding resource. The CUE can specify the EUE 2 through HARQ process scheduled for the CUE on the resource on which the NOMA signal will be received. For instance, the CUE can be informed on an HARQ process number by the base station (e.g., through C-DCI). The CUE can specify an EUE (e.g., EUE 2) mapped to the HARQ process number indicated by the base station. For clarity, the CUE exemplarily receives the signaling of the HARQ process number through C-DCI, by which the scope of the appended claims and their equivalents is non-limited. According to another embodiment, an HARQ process number can be indicated through upper layer signaling, separate signaling of E-DCI, or NOMA DCI as well as C-DCI.

The base station transmits E-DCI to the EUE [S1015]. Using the information (e.g., RNTI of EUE 2, etc.) on the specified EUE 2, the CUE can overhear or blind-detect the E-DCI transmitted to the EUE 2. According to another embodiment, the base station may transmit E-DCI or information corresponding to the E-DCI to the CUE through separate signaling.

The CUE receives the NOMA signal in which signals of the NOMA-paired UEs are multiplexed by different power values [S1020].

The CUE can cancel the interference caused by the EUE 2 from the received NOMA signal [S1025]. For instance, the CUE can obtain (e.g., demodulate and/or decode) a signal (e.g., E-PDSCH) of the EUE 2 from the NOMA signal through E-DCI. In obtaining the signal of the EUE 2 from the NOMA signal, the CUE can regard a CUE's signal (e.g., C-PDSCH) included in the NOMA signal as a general noise and is able to perform demodulation and decoding of an existing signal (e.g., non-NIMA operation). The reason for this is described as follows. First of all, since a power of the CUE's signal is negligibly small in comparison with the signal of the EUE 2, the CUE can obtain the signal of the EUE 2 despite not performing the interference cancellation by the NOMA operation. Yet, in obtaining the signal of the EUE 2 more accurately, the CUE is not prohibited from cancelling interference caused by the CUE's signal by NOMA scheme.

The CUE can encode and modulate the EUE 2's signal (e.g., a decoding completed information bit sequence) detected from the NOMA signal through E-DCI. In the step of encoding and modulating the EUE 2's signal, it is able to use such information, which is obtained through E-DCI, as a coding rate, a modulation order, a transport block size and the like. The CUE can estimate the interference caused by the EUE 2 by applying a modulated symbol obtained by modulating the EUE 2' signal to a current channel information (e.g., a channel state on receiving the NOMA signal, a last estimated channel state). The CUE can cancel the estimated interference from the NOMA signal.

The CUE can demodulate and/or decode the CUE's signal in the NOMA signal from which the interference caused by the EUE 2 is canceled [S1030]. For the demodulation/decoding of the CUE's signal, C-DCI received from the base station can be used.

Device Configuration According to Embodiment of Present Invention

Figure 11:
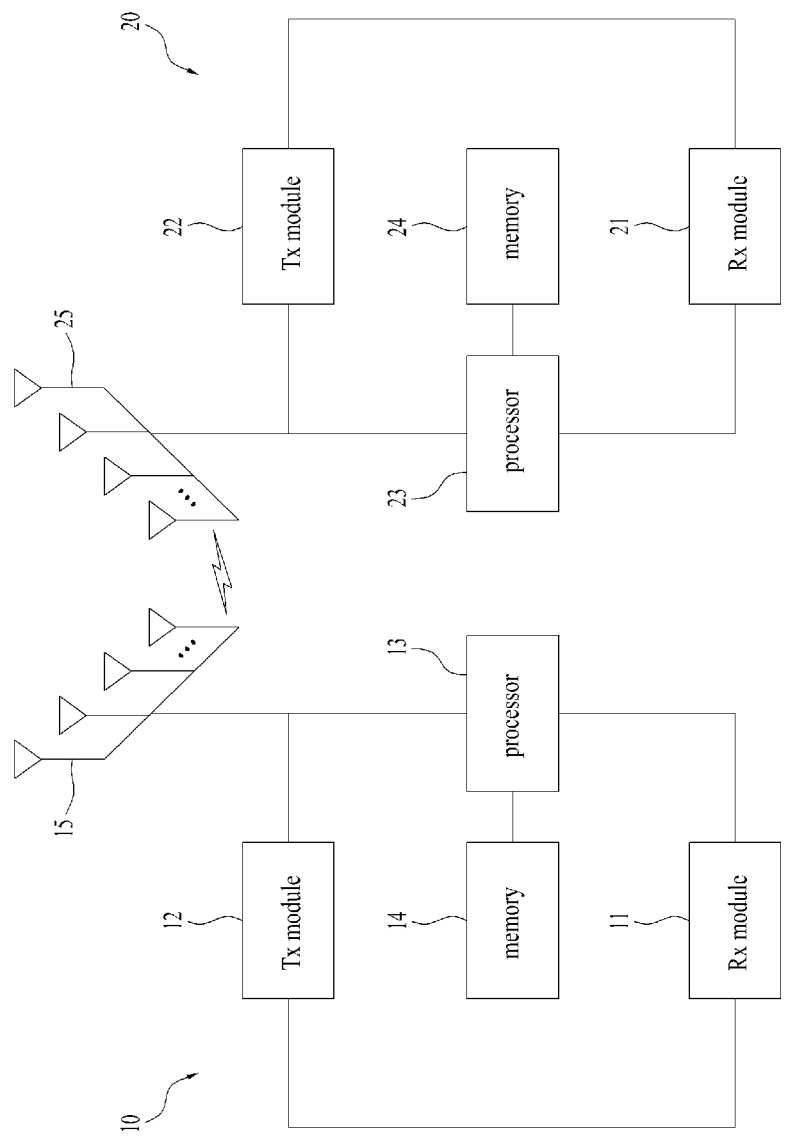
FIG. 11 is a diagram showing configurations of a transmitting point device and a receiving point device according to an embodiment type of the present invention.

FIG. 11 is a diagram showing configurations of a transmitting point device and a receiving point device according to an embodiment type of the present invention. In the drawing, the transmitting point device (e.g., base station) and the receiving point device (e.g., user equipment) can perform the methods of the aforementioned embodiments and description redundant with the aforementioned contents can be omitted.

Referring to FIG. 11, a transmitting point device 10 according to one embodiment of the present invention may include a receiving (Rx) module 11, a transmitting (Tx) module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and can be substituted with such a component as a buffer (not shown in the drawing) and the like.

Referring still to FIG. 11, a receiving point device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a transmitting point. The transmitting module 22 can transmit various signals, data and information in uplink to the transmitting point. And, the processor 23 can control overall operations of the receiving point device 20.

The processor 23 of the receiving point device 20 according to one embodiment of the present invention can process or handle the items required for the respective embodiments mentioned in the foregoing description.

The processor 23 of the receiving point device 20 performs functions of operating and processing information received by the receiving point device 20, information to be transmitted by the receiving point device 20, and the like. The memory 24 can store the operated and processed information and the like for a prescribed period and can be substituted with such a component as a buffer (not shown in the drawing) and the like.

In the above-mentioned detailed configurations of the transmitting point device and the receiving point device, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 10 with reference to FIG. 11 may be identically applicable to a relay node device as a DL transmitting entity or a UL receiving entity. And, the description of the receiving point device 20 with reference to FIG. 11 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. The present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of receiving a signal by a first user equipment (UE) in a wireless communication system supporting non-orthogonal multiple access (NOMA), the method comprising:
   receiving a NOMA signal in which signals of NOMA-paired UEs are multiplexed by different power values; and
   canceling, from the NOMA signal, interference caused by a second UE which is paired with the first UE, on a resource in which the NOMA signal is received,
   wherein the first UE is NOMA-paired with a plurality of UEs including the second UE on different resources, respectively and
   wherein the second UE among the plurality of UEs is specified through a hybrid automatic repeat request (HARQ) process scheduled for the first UE on the resource in which the NOMA signal is received.

2. The method of claim 1, wherein each of the plurality of UEs NOMA-paired with the first UE is mapped to at least one of a plurality of HARQ processes configured for the first UE.

3. The method of claim 1, wherein the first UE and each of the plurality of UEs have a same HARQ process number on a NOMA-paired resource.

4. The method of claim 1, further comprising:
   obtaining downlink control information of the second UE based on identifier information of the specified second UE,
   wherein in canceling the interference, a signal of the second UE detected through the downlink control signal of the second UE is canceled from the NOMA signal.

5. The method of claim 1, wherein at least two of the plurality of UEs are NOMA-paired with the first UE on different physical resource blocks (PRBs) of a same subframe.

6. The method of claim 5, further comprising:
   receiving, from a base station, information on a frequency band of each of the at least two UEs,
   wherein the information on the frequency band indicates an entire frequency band of each of the at least two UEs including the PRBs.

7. The method of claim 1, further comprising:
   receiving information indicating a set of subframes in which NOMA operation with the plurality of UEs is performed.

8. The method of claim 1, further comprising:
   receiving information on the plurality of UEs NOMA-paired with the first UE.

9. A first user equipment (UE) for receiving a signal in a wireless communication system supporting non-orthogonal multiple access (NOMA), the first UE comprising:
   a receiver for receiving a NOMA signal in which signals of NOMA-paired UEs are multiplexed by different power values; and
   a processor for canceling, from the NOMA signal, interference caused by a second UE which is paired with the first UE, on a resource in which the NOMA signal is received,
   wherein the first UE is NOMA-paired with a plurality of UEs including the second UE on different resources, respectively and
   wherein the second UE among the plurality of UEs is specified through a hybrid automatic repeat request (HARQ) process scheduled for the first UE on the resource in which the NOMA signal is received.

10. The first UE of claim 9, wherein each of the plurality of UEs NOMA-paired with the first UE is mapped to at least one of a plurality of HARQ processes configured for the first UE.

11. The first UE of claim 9, wherein the first UE and each of the plurality of UEs have a same HARQ process number on a NOMA-paired resource.

12. The first UE of claim 9,
   wherein the receiver receives downlink control information of the second UE based on identifier information of the specified second UE and
   wherein the processor cancels a signal of the second UE detected through the downlink control signal of the second UE from the NOMA signal.

13. The first UE of claim 9, wherein at least two of the plurality of UEs are NOMA-paired with the first UE on different physical resource blocks (PRBs) of a same subframe.

14. The first UE of claim 13,
   wherein the receiver receives information on a frequency band of each of the at least two UEs from a base station and
   wherein the information on the frequency band indicates an entire frequency band of each of the at least two UEs including the PRBs.

15. The first UE of claim 9, wherein the receiver receives information indicating a set of subframes in which NOMA operation with the plurality of UEs is performed and receives information on the plurality of UEs NOMA-paired with the first UE.

* * * * *